United States Patent

Hinedi et al.

[11] Patent Number: 6,088,341
[45] Date of Patent: Jul. 11, 2000

[54] METHOD FOR REDUCING CO-CHANNEL OF CROSS-POLARIZATION INTERFERENCE IN A SATELLITE DATA COMMUNICATION SYSTEM BY OFFSETTING CHANNEL FREQUENCIES

[75] Inventors: Sami Hinedi, Bellevue; Shiva Sarrafan, Issaquah, both of Wash.

[73] Assignee: Teledesic LLC, Kirkland, Wash.

[21] Appl. No.: 09/162,380

[22] Filed: Sep. 28, 1998

[51] Int. Cl.[7] .............................. H04B 7/204; H04J 1/00; H04K 1/10

[52] U.S. Cl. ........................... 370/319; 375/260; 370/343

[58] Field of Search ..................... 370/310, 319, 370/343, 480, 485; 375/260, 285, 346; 455/13.4, 103, 7, 11.1, 12.1, 13.3, 17, 20, 13.1

[56] References Cited

U.S. PATENT DOCUMENTS

5,469,468  11/1995  Schilling ................... 370/320
5,555,257  9/1996  Dent ........................ 370/319

*Primary Examiner*—Chau Nguyen
*Assistant Examiner*—Phuong Chau Ba Nguyen
*Attorney, Agent, or Firm*—Christensen O'Connor Johnson & Kindness PLLC

[57] ABSTRACT

A method for reducing co-channel or cross-channel interference between cells of a cell network in a frequency division multiple access (FDMA) communications system is disclosed. The method comprises the steps of: dividing the cells of the cell network into a first subset of cells and a second subset of cells; dividing the available bandwidth for the system into a first set of sub-bands, each of which has a sub-band bandwidth and a second set of sub-bands, each of which has a sub-band bandwidth, the second set of sub-bands being offset in frequency from the first set of sub-bands; assigning the first set of sub-bands to the first subset of cells and the second set of sub-bands to the second subset of cells.

19 Claims, 7 Drawing Sheets

METHOD FOR REDUCING CO-CHANNEL OF CROSS-POLARIZATION INTERFERENCE IN A SATELLITE DATA COMMUNICATION SYSTEM BY OFFSETTING CHANNEL FREQUENCIES

TECHNICAL FIELD OF THE INVENTION

This invention relates to satellite data communication systems and, more particularly, to a method for reducing co-channel or cross-polarization interference in a FDMA system.

BACKGROUND OF THE INVENTION

In recent years the need for global data networking capability has rapidly expanded. In order to meet this need, broadband satellite communication systems have been proposed as an alternative to land-based communication systems. One type of satellite data communication system is described in a number of U.S. patents assigned to the assignee of this patent application, including U.S. Pat. Nos. 5,386,953; 5,408,237; 5,527,001; 5,548,294; 5,641,135; 5,642,122, and 5,650,788. These patents and other pending applications assigned to the assignee of this patent application describe a satellite communication system that includes a constellation of low-Earth-orbit (LEO) satellites that implement an Earth-fixed cellular beam approach to transmitting data from one location on the Earth's surface to another location. In an Earth-fixed cellular beam system, the entire Earth is divided into a plurality of non-overlapping cells. Each of the cells are of similar predetermined size and are fixed with respect to the Earth.

More specifically, each LEO satellite has a communication footprint that covers a portion of the Earth's surface as a satellite passes over the Earth. The communication footprint defines the area of the Earth within which ground terminals can communicate with the satellite. Located within each footprint are a large number of the cells. During the period of time a cell remains within the borders of a satellite footprint, ground terminals located in the cell transmit data to and receive data from the "servicing" satellite.

As the servicing satellite moves through orbit, the footprint of the servicing satellite will move across the Earth. Thus, new cells at the leading edge of the footprint are added to the coverage of the servicing satellite. Similarly, cells at the trailing edge of the footprint are removed from the coverage of the servicing satellite. As the cells on the trailing edge of the footprint of the servicing satellite are dropped, another satellite in orbit is positioned to "service" each Earth-fixed cell previously covered by the satellite reaching the end of its servicing arc. During servicing, the antennas of ground terminals located in the cells continuously point toward the servicing satellite as it moves in orbit and antennas on the satellite point toward the cells. Other LEO satellite communication systems employ a satellite-fixed beam approach whereby the antenna beams from the servicing satellite remain fixed with respect to the satellite.

Regardless of whether an Earth-fixed cell system or a satellite-fixed beam system, data to be sent from one location on the Earth to another location is transmitted from a ground terminal located within a cell to the satellite serving the cell via an uplink data channel. The data is routed through the constellation of LEO satellites to the satellite serving the cell within which the ground terminal of the designated receiver is located. The latter satellite transmits the data to the receiver ground terminal via a downlink data channel. Thus, the constellation of LEO satellites and the ground terminals form a satellite data communication network wherein each ground terminal and satellite forms a node of the network.

In order to maximize the efficient use of the uplink and downlink bandwidth, various types of multiple access techniques may be used between the LEO satellites and the cells. One popular technique is frequency division multiple access (FDMA). In this well known technique, the available bandwidth is divided into a plurality of channels, each channel operating on a predetermined frequency range within the available bandwidth. See, e.g., J. D. Gibson, "The Mobile Communications Handbook", at 280–282, IEEE Press (1996); T. S. Rappaport, "Wireless Communications: Principles & Practice", at 397–400, Prentice-Hall (1996). Optimally, the assignment of frequency ranges to each channel is performed so as to minimize interference between adjacent channels (referred to as "cross-channel interference").

One shortcoming of a FDMA system is that FDMA is susceptible to co-channel or cross-polarization interference between cells that are using the same channel and that are communicating with the same satellite as the signal of interest. Indeed, co-channel interference will occur in any communications system that reuses frequency resources. To increase communication capacity per footprint, it is desirable to assign the channels in such a manner so as to minimize the spatial distance between cells using the same channel. Therefore, co-channel or cross-polarization interference will always appear.

One method of dealing with the co-channel interference is to design the satellite antenna to be extremely focused spatially, i.e., only have the antenna receive signals from the geographic area of the specified cell. The antenna gain pattern should have sidelobes that give minimal gain to signals outside of the main lobe. Thus, the antenna should have low sensitivity to signals that do not originate from a point of interest. While this can be done, it adds complexity and cost to the antenna.

Cross-polarization interference will occur in any communications system that uses bi-polarization schemes. Cross-polarization interference refers to the signal degradation caused by users within the same footprint that have been assigned the same channel as the signal of interest, but using an opposite polarization as the signal of interest. One method of dealing with cross-polarization interference is to design the satellite antenna to be polarization selective. In other words, the maximum axial ratios of the receive and transmit antennas must be tightly specified. However, the axial ratios of the antennas are not constant in all directions and generally increase with off-axis and scan angles. In addition, the received signals do not always retain their original polarization due to atmospheric phenomena. Additionally, manufacturing antennas that can maintain absolute orthogonality (i.e., infinitely low axial ratios) is difficult. Cross-polarization interference is particularly noticeable in the case of multiple users in the same cell as the signal of interest that use an orthogonal polarization scheme. This is because the only form of discrimination between such users is cross-polar isolation and there is no spatial discrimination available between these "cross-polar" users.

In order to minimize the complexity and cost of the satellite antenna, what is needed is a new method for efficiently reducing co-channel or cross-polarization interference in satellite communication systems, while maintaining a desired capacity density. Alternatively, the present invention may be used in conjunction with antenna design to further decrease co-channel or cross-polarization interference.

SUMMARY OF THE INVENTION

A method for reducing co-channel or cross-polarization interference between cells of a cell network in a frequency division multiple access (FDMA) communications system is disclosed. The method comprises the steps of: dividing the cells of the cell network into a first subset of cells and a second subset of cells; dividing the available bandwidth for the system into a first set of sub-bands having a sub-band bandwidth; and a second set of sub-bands having a sub-band bandwidth, the second set of sub-bands being offset in frequency from the first set of sub-bands; assigning the first set of sub-bands to the first subset of cells and assigning the second set of sub-bands to the second subset of cells.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figures 1, 2:
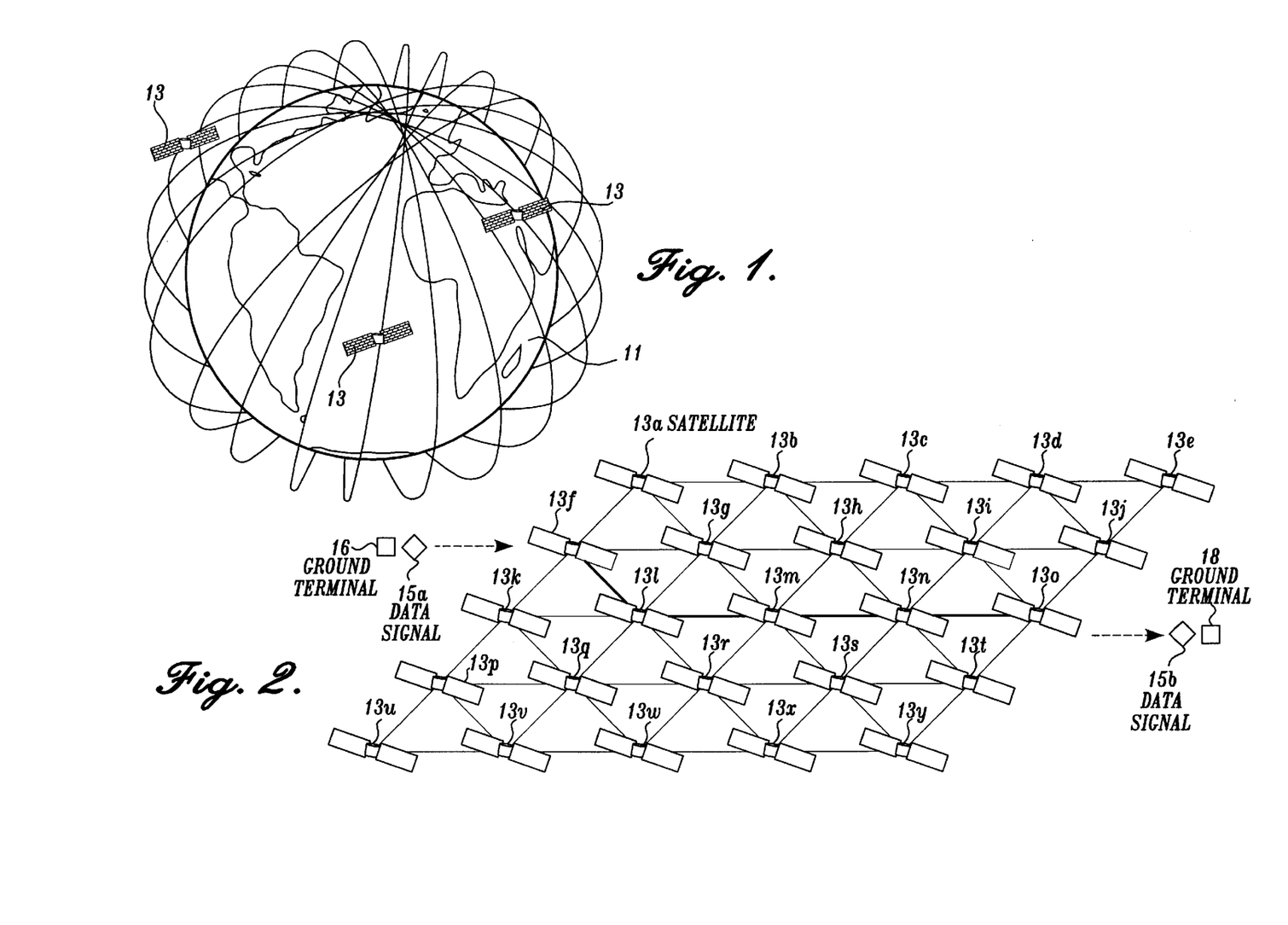
FIG. 1 is a pictorial diagram showing the orbital paths of the satellites of a constellation of low-Earth orbit (LEO) satellites positioned to cover the entire surface of the Earth.
FIG. 2 is a plan view of a portion of the constellation of LEO satellites depicted in FIG. 1.

The present invention is directed to a channel assignment and allocation system that is ideally suited for use in a low-Earth-orbit (LEO) satellite communication network using frequency division multiple access (FDMA). A LEO satellite communication network includes a constellation of satellites orbiting the Earth such that a majority of the Earth is within the view of at least one satellite at any point in time. One proposed LEO satellite communication network employs 288 satellites, plus spares, located in 12 polar orbit planes. Each plane includes 24 satellites at an altitude of approximately 1,350 kilometers. The path of travel of the satellites of such a network is generally depicted in FIG. 1. More specifically, FIG. 1 depicts the Earth 11 surrounded by a plurality of rings that depict the orbital planes of a plurality of satellites 13.

FIG. 2 illustrates a number of the satellites 13a, 13b, 13c ... that make up the constellation of satellites included in a LEO satellite communication network of the type illustrated in FIG. 1. The satellites are shown closer to one another for illustrative purposes only. As shown in FIG. 2, a data signal 15a, consisting of one or more data packets, is transmitted on an uplink data communication channel by a ground terminal 16 and received by a first satellite 13f that forms part of the constellation of satellites. The data packets are routed through the constellation of satellites. The routing path is dependent on network traffic. For example, the receiving or uplink satellite may forward the one or more data packets to a second satellite 13l, which forwards the data packets to a third satellite 13m, which forwards the data packets to a fourth satellite 13n. The routing continues until the data packets reach the satellite 13o associated with the ground terminal 18 that is to receive the data packets. This satellite, called the sending or downlink satellite, transmits the data packets as a data signal 15b to the receiving ground terminal 18. The receiving ground terminal forwards the data to an end user. It is to be understood that the data packets of a message may be routed through different paths in the constellation of satellites and may arrive at the ground terminal in a different order than they were sent. In this case, upon receipt at the ground terminal the data packets are re-ordered in the correct order before data is forwarded to the end user.

Figure 3:
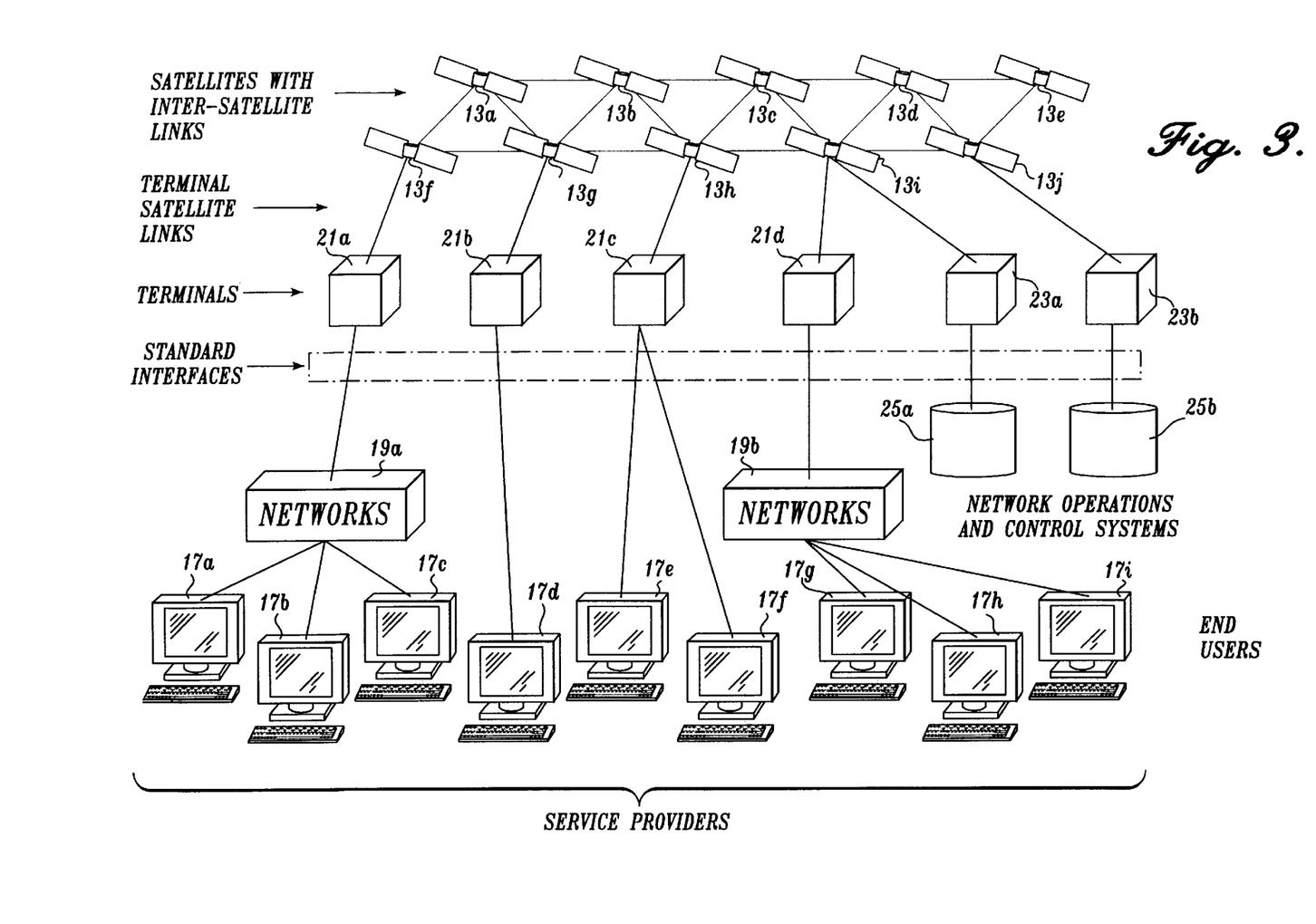
FIG. 3 a pictorial view showing the various signal paths to and from a constellation of LEO satellites of the type depicted in FIGS. 1 and 2.

FIG. 3 further illustrates the LEO satellite communication network. End users 17a, 17b, 17c ... are connected either through networks 19a and 19b ..., or directly, to ground terminals 21a, 21b, 21c ... The networks 19a, 19b, ... may, for example, be conventional switched public telephone system networks, corporate networks or other proprietary networks. Network operations and control systems 25a and 25b are shown as communicating with the satellites via separate terminals 23a and 23b. All of the ground terminals are designed to transmit signals to and receive signals from the constellation of satellites via uplink and downlink data channels. Since LEO satellites, in contrast to geosynchronous satellites, move with respect to the Earth, the region of the Earth covered by a satellite's footprint is also constantly moving. Preferably, the LEO satellite communication network of the present invention employs Earth-fixed cellular beam technology. In an Earth-fixed cellular beam system the surface of the Earth is mapped with a number of cells. As a LEO satellite passes over the Earth, the satellite's antennas are controlled so that the beams of the antennas are steered to remain pointed at the center of each cell located within a satellite's footprint. For a predetermined period of time, the cells located within the satellite's footprint are therefor served by the same satellite as the satellite moves in orbit over the cell. Alternatively, the present invention is also equally applicable for a satellite communication system employing satellite-fixed beams.

Figure 4:
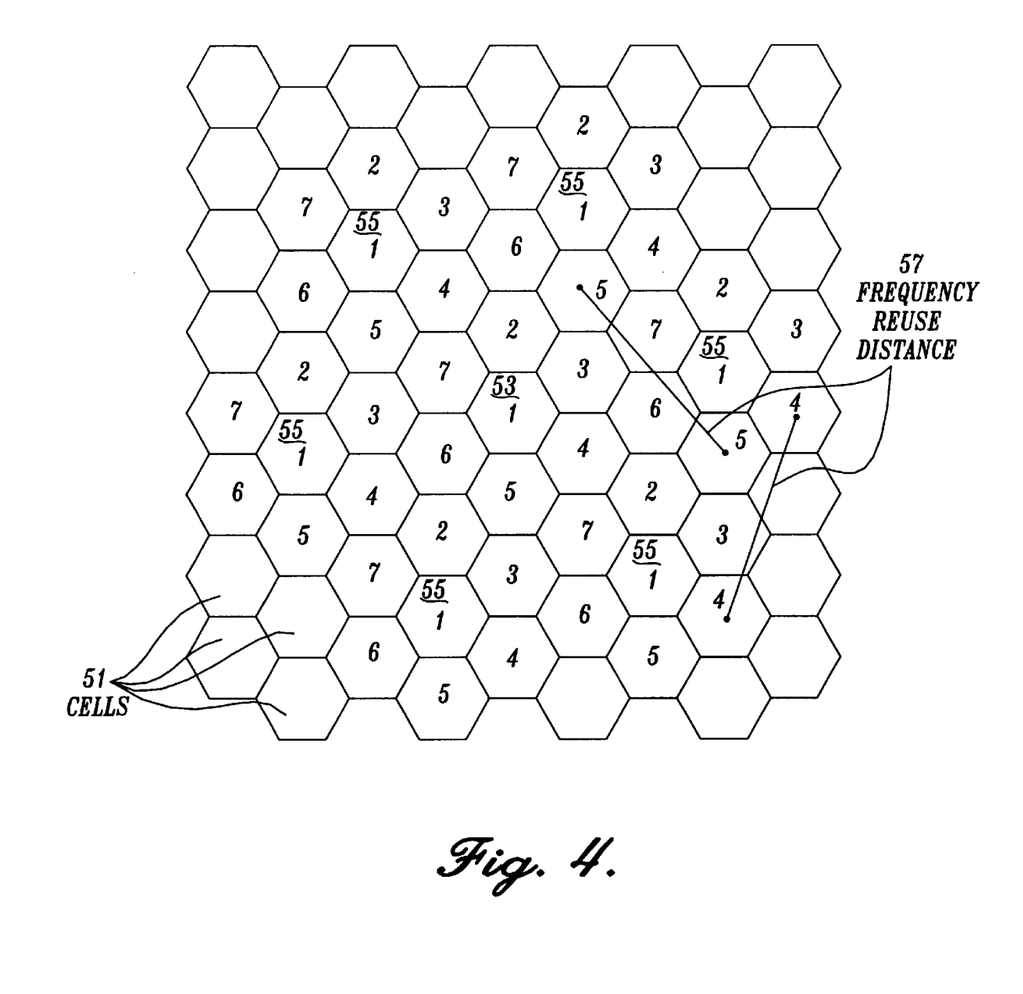
FIG. 4 is a schematic diagram of a portion of the Earth covered with cells in accordance with the invention.

FIG. 4 shows a schematic view of an arbitrary portion of the Earth that is mapped with cells 51. In this embodiment, the available bandwidth for use on the uplink has been partitioned into seven sub-bands for use by the system. A "sub-band" is a block of bandwidth that is shared for communication purposes by a number of users. The sub-band may be subdivided into communication frequency channels, each communication frequency channel used by individual uplink terminals for the transmission of data.

Alternatively, the entire bandwidth of the sub-band may be shared by multiple users using a time division multiple access (TDMA) scheme. The present invention is equally applicable regardless of how multiple users share the bandwidth in a particular sub-band.

Figure 5:
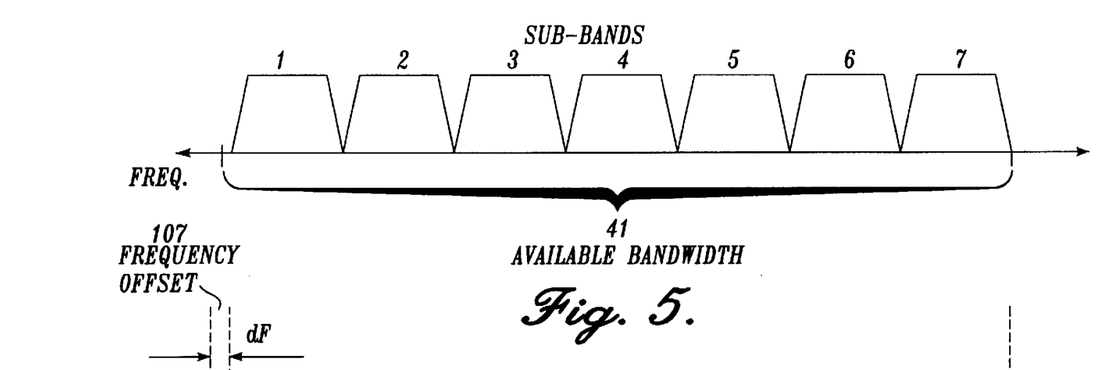
FIG. 5 is a schematic diagram showing how an available band is partitioned into seven sub-bands for use in a FDMA system.

FIG. 5 illustrates schematically how an available band 41 is partitioned into seven sub-bands. These sub-bands are assigned to cells 51 and designated by numerals 1–7 in FIG. 4. The scheme used to assign sub-bands to cells shown in FIG. 4 produces the largest possible spatial distance between users in each of the cells 51 that are using the same channel. Cells 51 that are using the same sub-band are referred to as co-channel cells. The distance between the co-channel cells is referred to as the "frequency reuse distance" and is exemplified by the distance 57.

To see how co-channel interference may arise, a signal of interest originating from a signal of interest cell 53 using sub-band 1 is designated in the center of FIG. 4. The signal of interest cell 53, or simply SOI cell 53, is the cell that originates the signal that the assigned LEO satellite antenna wishes to receive. Nominally, a beam of the assigned antenna of the LEO satellite will be focused only upon the SOI cell 53. However, the assigned beam will often also receive signals transmitted from the co-channel cells 55 of the SOI cell 53. The only prior method for discriminating between the signals from the co-channel cells 55 and the SOI cell 53 is to use antenna sidelobe discrimination.

Figure 6:
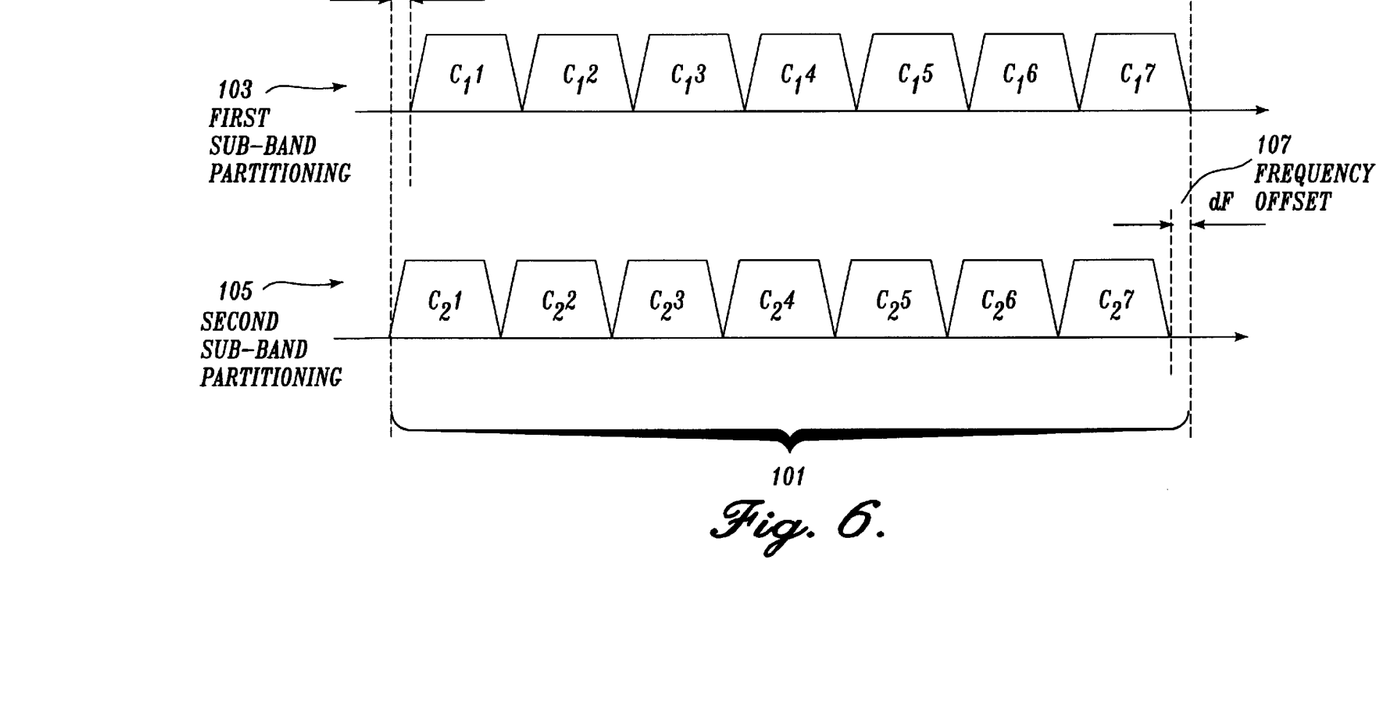
FIG. 6 is a schematic diagram showing how an available band is partitioned into seven sub-bands for each of two layouts in accordance with the present invention.

In accordance with the present invention, the cells of the network are divided into two subsets. The cells in the first subset have sub-bands assigned according to a first sub-band partitioning scheme and the cells in the second subset have sub-bands assigned according to a second sub-band partitioning scheme. As seen in FIG. 6, the first sub-band partitioning scheme 103 have their frequencies offset from the channels of the second sub-band partitioning scheme 105. Preferably, the amount of offset in frequency dF 107 is equal to one half of the bandwidth of a communication frequency channel. It should be noted that FIG. 6 is not drawn to scale and the amount of offset in frequency dF 107 is exaggerated.

Looking at FIG. 6 in greater detail, an available bandwidth 101 that is being employed by the system is partitioned into sub-bands using two sub-band partitioning schemes 103 and 105. The first sub-band partitioning scheme 103, in this preferred embodiment, partitions the available bandwidth 101 into seven sub-bands, designated $C_1 1, C_1 2, \ldots, C_1 7$. Importantly, note that the first sub-band $C_1 1$ does not begin at the beginning of the available bandwidth 101. Instead, first sub-band $C_1 1$ begins at a frequency offset from the beginning of the available bandwidth 101. Additionally, note that the termination of the last sub-band $C_1 7$ preferably occurs near or at the termination of the available bandwidth 101.

Further, although the available bandwidth 101 is partitioned to include seven sub-bands, it can be appreciated that the number of sub-bands within the available bandwidth 101 may vary, depending upon such factors as the size of the available bandwidth, the required bandwidth for the individual channels, the inclusion of guard bands between channels, and the design of the FDMA system.

The second sub-band partitioning scheme 105, in this preferred embodiment, also partitions the available bandwidth 101 into seven sub-bands, designated $C_2 1, C_2 2, \ldots, C_2 7$. Preferably, these sub-bands have equal bandwidth and are equivalent to the bandwidth of the sub-bands in the first sub-band partitioning scheme 103. Unlike the first sub-band partitioning scheme 103, note that the first subband $C_2 1$ begins at the beginning of the available bandwidth 101. Thus, the first sub-band $C_2 1$ is offset from the first sub-band $C_1 1$ by an amount designated as dF 107 and is preferably one-half of the communication frequency channel. It should be noted that FIG. 6 is not drawn to scale and the amount of the offset dF 107 is exaggerated. Similarly, sub-band $C_2 2$ is offset from sub-band $C_1 2$ by an amount dF 107. The same frequency offset is true for each of the seven sub-bands. Additionally, note that the termination of the last sub-band $C_2 7$ occurs prior to the termination of the available bandwidth 101 by an amount equivalent to dF 107.

Figure 7:
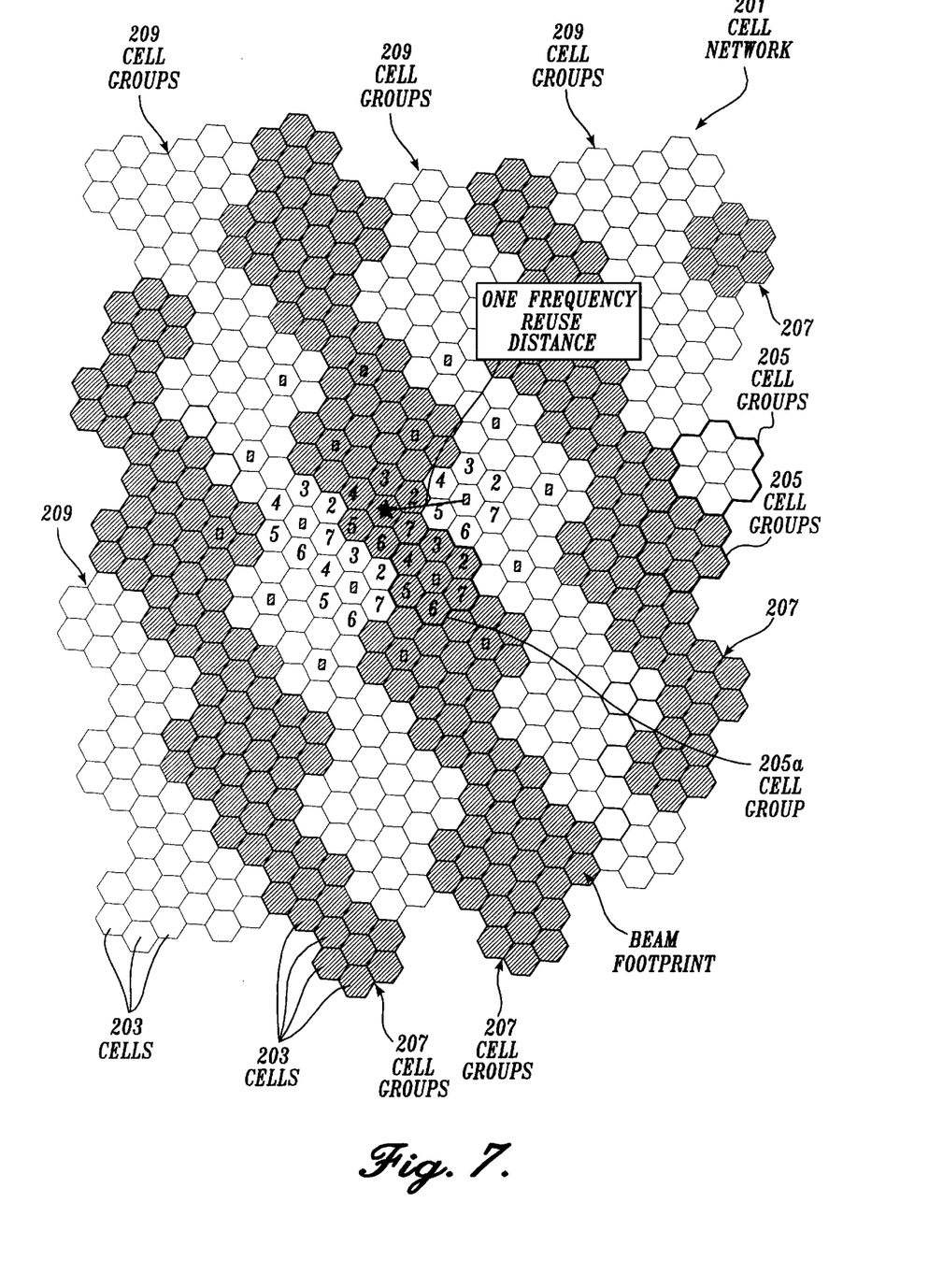
FIG. 7 is a schematic diagram of one example of how a cell network is assigned sub-bands of the two layouts in accordance with the present invention.

With the description of the partitioning of the available bandwidth 101 described, the assignment of the sub-bands to a cell network will now be described. Turning to FIG. 7, a cell network 201 is shown. The cell network 201 is comprised of a plurality of individual cells 203. The cell network 201 shown in FIG. 7 may be the complete cell network, or more commonly in the context of a LEO satellite communications network, be but a portion of a larger cell network. For example, the cell network 201 shown in FIG. 7 may be only the cells within the footprint of a single LEO satellite.

Within the cell network, the individual cells are logically arranged into cell groups 205 or clusters in a repetitive pattern. Each cell in a cluster is assigned one sub-band. The distance between cells assigned the same sub-band is the frequency reuse distance of the cell network. The sub-bands being used in the FDMA system is variable depending upon the design of the FDMA system, but is typically equivalent to the number of cells that are grouped together in a frequency reuse group. In this example, the number of cells per frequency reuse group is seven and therefore each cell group 205 has seven sub-bands. Each cell of the cell group 205 is then assigned a different sub-band from either the first sub-band partitioning scheme 103 or the second sub-band partitioning scheme 105. Thus, in the cell group 205a, the center cell is assigned sub-band $C_1 1$ or $C_2 1$, depending upon whether or not the first or second sub-band partitioning scheme is used. Similarly, the cells that surround the center cell of the cell group 205a are assigned sub-bands $C_{(1\ or\ 2)} 2$ through $C_{(1\ or\ 2)} 7$.

In accordance with the present invention, it is preferable that cell groups 205 that are spatially adjacent to one another use the opposite sub-band partitioning scheme. However, because each cell group 205 has six adjacent cell groups 205, it is impossible when using only two sub-band partitioning schemes to make each cell group have a different sub-band partitioning scheme. Therefore, when using only two sub-band partitioning schemes, certain of the adjacent cell groups will be using the same sub-band partitioning scheme.

In FIG. 7, the cross-hatched cell groups 207 are assigned the sub-bands of the first sub-band partitioning scheme 103 and the cell groups 209 that are not cross-hatched are assigned sub-bands of the second sub-band partitioning scheme 105. As can be seen, each cell group has three of its adjacent cell groups using the same sub-band partitioning scheme and three of its adjacent cell groups using the different sub-band partitioning scheme.

Figure 8:
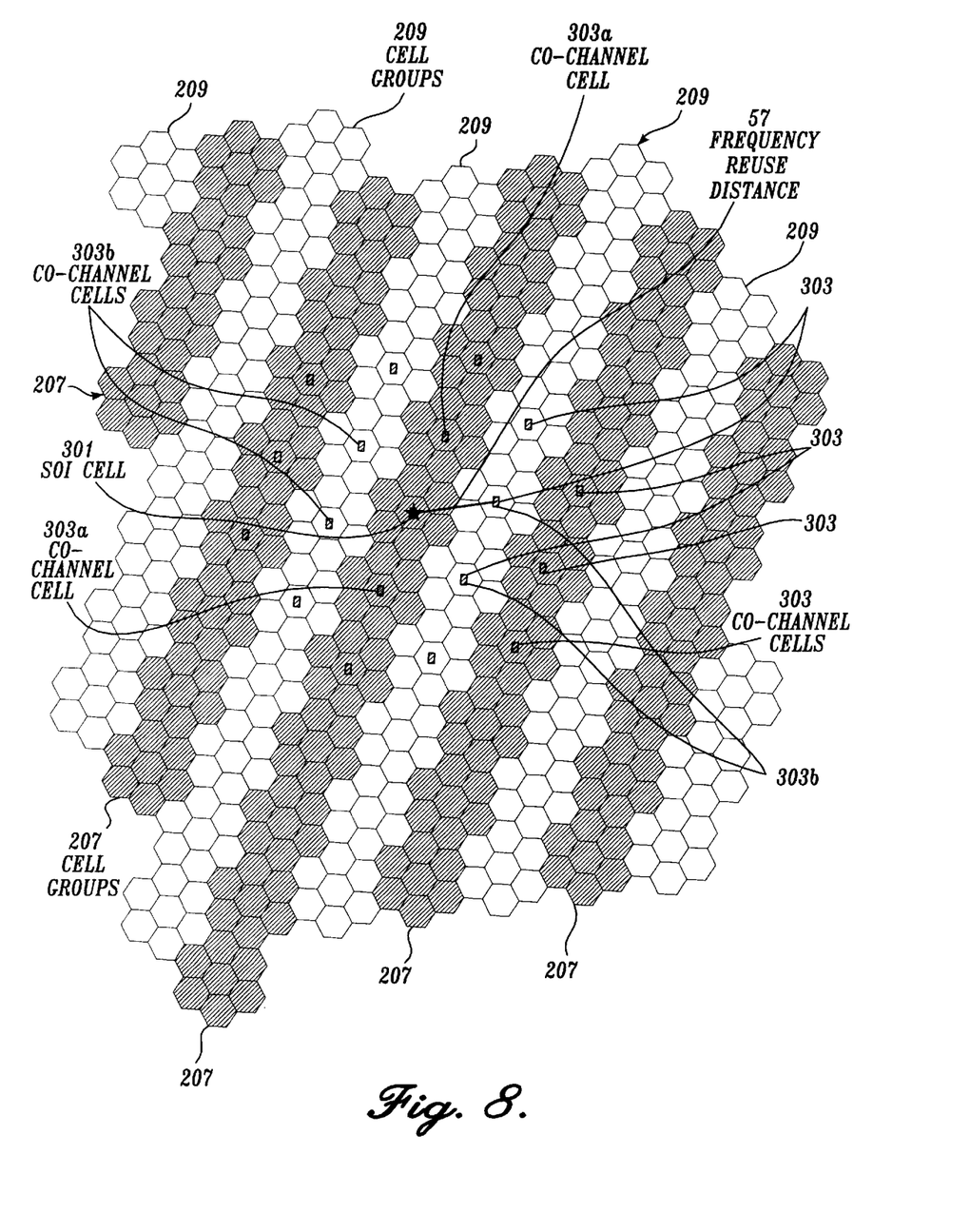
FIG. 8 is a schematic diagram of another example of how a cell network is assigned sub-bands of the two layouts in accordance with the present invention.

FIG. 8 illustrates a different assignment scheme of an alternating pattern of first and second groups of cells. This assignment scheme provides each cell group having two of its adjacent cell groups using the same sub-band partitioning scheme and four of its adjacent cell groups using the different sub-band partitioning scheme. As can be seen, alternating "columns" of the cell network are formed from cell groups that share the same sub-band partitioning scheme. In the "intermixing" scheme of FIG. 8, each cell group has four adjacent cell groups that use a different sub-band partitioning scheme.

It should be noted that additional sub-band partitioning schemes may be used and conceivably the number of sub-band partitioning schemes may equal the number of sub-bands used in the available bandwidth 101. In the case of having multiple sub-band partitioning schemes, it is preferred that the amount of frequency offset dF 107 be equivalent to the communication frequency channel bandwidth divided by the number of sub-band partitioning schemes. In the example given above, the number of sub-band partitioning schemes is two and therefore the preferred frequency offset dF 107 is one-half of the communication frequency channel bandwidth. Similarly, if the number of sub-band partitioning schemes is three, the preferred frequency offset dF 107 is one-third of the communication frequency channel bandwidth. If the number of channel partitioning schemes is seven, the preferred frequency offset dF 107 is one-seventh of the communication frequency channel bandwidth.

Once the cells of the cell network have been assigned sub-bands, these sub-band assignments must be stored at each LEO satellite in order for the signal processing circuitry of the LEO satellite to appropriately discriminate the signals from the cells. In one preferred embodiment, each LEO satellite includes a table that corresponds each cell of the cell network to a sub-band assignment. It can be appreciated that the table may be updated from time to time using conventional methods in order to reflect modifications to the sub-band assignments of the cells.

To see how the present invention helps reduce co-channel interference, reference is made to FIG. 8. A signal of interest (SOI) coming from a SOI cell 301 is subject to co-channel interference from other co-channel cells 303. However, there are only two co-channel cells that are one frequency reuse distance 57 from the SOI cell 301 and that are using the precise same sub-band. These are designated in FIG. 8 by reference numeral 303a. There are four co-channel cells that are one frequency reuse distance 57 from the SOI cell 301 and that are using the corresponding sub-band from the alternate sub-band partitioning scheme. These are designated by reference numeral 303b. In contrast, in the prior art, there would be six co-channel cells that are one frequency reuse distance 57 from the SOI cell 301 and that are using the precise same sub-band.

Because the co-channel cells 303b are on the alternate sub-band partitioning scheme from the SOI cell 301, band-pass filtering that takes place at the receiver (i.e., the LEO satellite) will be operative to eliminate much of the power from the co-channel cells 303b. This in turn will reduce the amount of co-channel interference.

The foregoing describes how the present invention is used to minimize co-channel interference. However, as noted above, the present invention may also be used to minimize cross-polarization interference. This is described below.

In a multiple polarization multiple access system, individual uplink users are assigned different polarization schemes. For example, one user may be assigned to transmit a signal to the satellite using vertical polarization and another user may be assigned to transmit a signal using horizontal polarization. Alternatively, one user may be assigned to transmit a signal to the satellite using right-hand circular polarization and another user may be assigned to transmit a signal using left-hand circular polarization.

As noted above, cross-polarization interference arises from two different users that are spatially close to one another and that use different (and typically) orthogonal polarizations.

Figure 9:
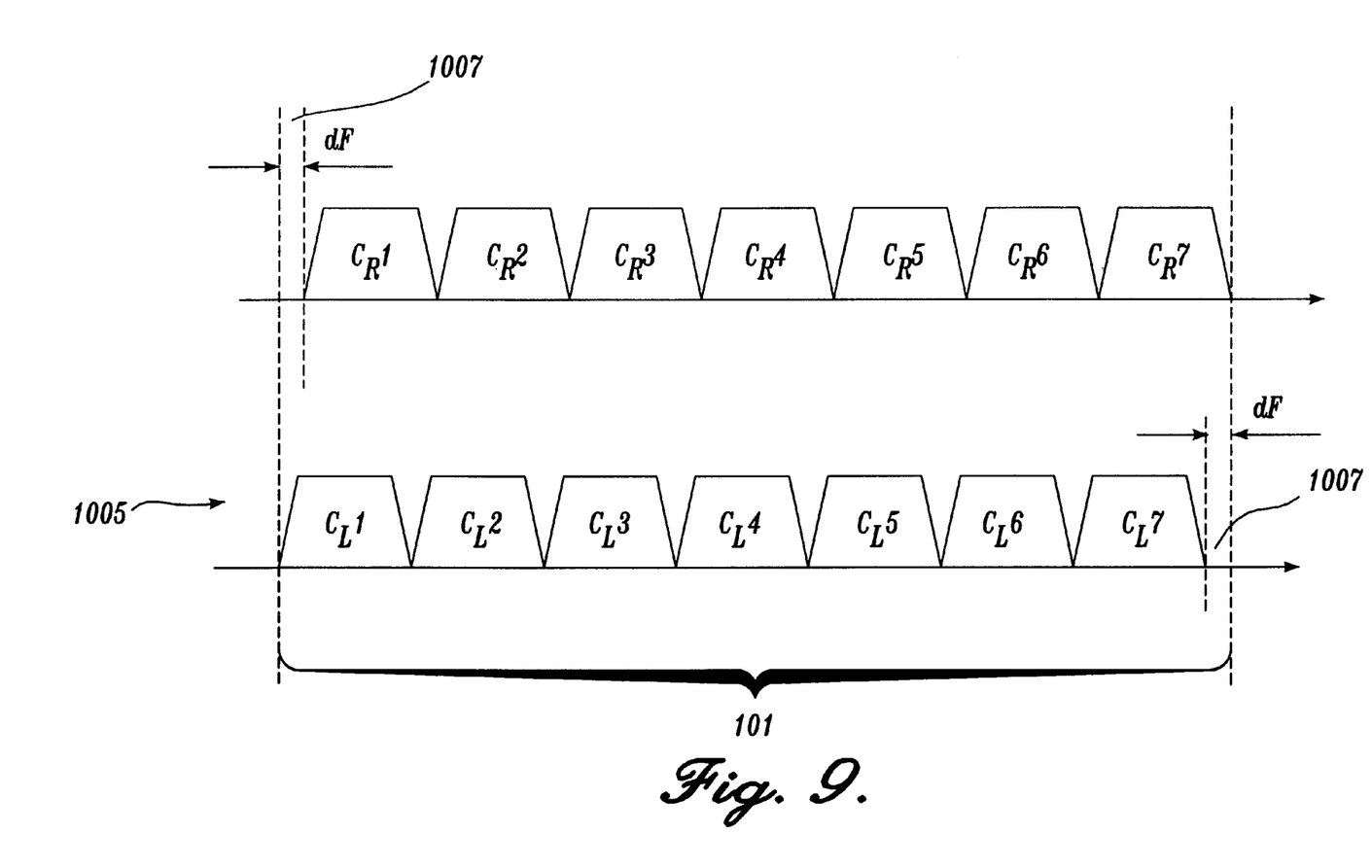
FIG. 9 is a schematic diagram showing how an available band is partitioned into seven sub-bands for each of the two layouts and cross-polarizations in accordance with the present invention.

Turning to FIG. 9, in accordance with the present invention, an available bandwidth 101 that is being employed by the FDMA system is partitioned into sub-bands using two sub-band partitioning schemes 1003 and 1005. The first sub-band partitioning scheme 1003, in this preferred embodiment, partitions the available bandwidth 101 into seven sub-bands, designated $C_R 1, C_R 2, \ldots, C_R 7$. Preferably, in accordance with standard FDMA techniques, these sub-bands have equal sub-band bandwidth. Importantly, note that the first sub-band $C_R 1$ does not begin at the beginning of the available bandwidth 101. Instead, first sub-band $C_R 1$ begins at a frequency offset dF 1007 from the beginning of the available bandwidth 101. Additionally, note that the termination of the last sub-band $C_R 7$ preferably occurs near or at the termination of the available bandwidth 101.

Further, although the available bandwidth 101 is partitioned to include seven sub-bands, it can be appreciated that the number of sub-bands within the available bandwidth 101 may vary, depending upon such factors as the size of the available bandwidth, the required bandwidth for the individual sub-bands, the inclusion of guard bands between sub-bands, and the design of the FDMA system.

The second sub-band partitioning scheme 1005, in this preferred embodiment, also partitions the available bandwidth 101 into seven sub-bands, designated $C_L 1, C_L 2, \ldots, C_L 7$. Preferably, these sub-bands have equal bandwidth and are equivalent to the bandwidth of the sub-bands in the first sub-band partitioning scheme 1003. Unlike the first sub-band partitioning scheme 1003, note that the first sub-band $C_L 1$ begins at the beginning of the available bandwidth 101. Thus, the first sub-band $C_L 1$ is offset from the first channel $C_R 1$ by an amount designated as dF 1007 and is preferably one-half of the communication frequency channel bandwidth. Similarly, sub-band $C_L 2$ is offset from sub-band $C_R 2$ by an amount dF 1007. The same frequency offset is true for each of the seven sub-bands. Additionally, note that the termination of the last sub-band $C_L 7$ occurs prior to the termination of the available bandwidth 101 by an amount equivalent to dF 1007.

Finally, all of the sub-bands in the first sub-band partitioning scheme 1003 utilize a right hand polarization scheme and all of the sub-bands in the second sub-band partitioning scheme 1005 utilize a left hand polarization scheme. It can be appreciated by those skilled in the art that other types of orthogonal polarizations may be implemented such as vertical/horizontal.

With the description of the partitioning of the available bandwidth 101 described, the assignment of the sub-bands to a cell network is as described above in connection with FIGS. 7 and 8. It will be appreciated that the assignment of different polarization schemes to each sub-band partitioning scheme thereby minimizes the amount of cross-polarization interference between users, while at the same time minimizing the co-channel interference.

While the preferred embodiment of the invention has been illustrated and described, it should be understood that various changes can be made therein. Hence, within the scope of the appended claims it is to be understood that the invention can be practiced otherwise than as specifically described herein.

What is claimed is:

1. A method for assigning communication frequency channels to users of a FDMA communications system employing an available bandwidth, said method comprising:

(a) partitioning said available bandwidth into a first set of sub-bands, said first set comprising several sub-bands each having a sub-band bandwidth;

(b) partitioning said available bandwidth into a second set of sub-bands, said second set comprising several sub-bands each having said sub-band bandwidth, the sub-bands of said second set corresponding to the sub-bands of the first set and being offset in frequency from the corresponding sub-bands of the first set by a predetermined frequency offset, the predetermined frequency offset being less than said sub-band bandwidth, whereby corresponding sub-bands of the first and second sets overlap in frequency but do not have identical frequency ranges; and (c) assigning some of the users a communication frequency channel within said first set of sub-bands and assigning others of said users a communication frequency channel within said second set of sub-bands, wherein said assigning the communication frequency channels is done in a periodic pattern to lessen the number of nearby users that are assigned a frequency channel within the same sub-band of the same subset.

2. The method of claim 1 wherein said predetermined frequency offset is equal to one-half of the bandwidth of the communication frequency channel.

3. The method of claim 1 wherein said first set of sub-bands have a first polarization and said second set of sub-bands have a second polarization, said first polarization being orthogonal to said second polarization.

4. The method of claim 1 wherein said first set of sub-bands have a first polarization and said second set of sub-bands have a second polarization, said first polarization being orthogonal to said second polarization.

5. The method of claim 1, including in step (a) partitioning the available bandwidth into a first set of a first predetermined number of sub-bands, and in step (b) partitioning the available bandwidth into a second set of a second predetermined number of sub-bands, the first predetermined number being the same as the second predetermined number, and each sub-band of the second set overlapping in frequency with a corresponding sub-band of the first set.

6. A method for reducing interference between cells of a cell network using an FDMA communications system employing an available bandwidth, said method comprising the steps of:

(a) dividing said cells of said cell network into a first subset of cells and a second subset of cells;

(b) partitioning said available bandwidth into a first set of sub-bands each having a sub-band bandwidth;

(c) partitioning said available bandwidth into a second set of sub-bands each having said sub-band bandwidth, the sub-bands of said second set corresponding to the sub-bands of the first set and being offset in frequency from the corresponding sub-bands of the first set by a predetermined frequency offset, the predetermined frequency offset being less than said sub-band bandwidth, whereby corresponding sub-bands of the first and second sets overlap in frequency but do not have identical frequency ranges;

(d) assigning said first set of sub-bands to said first subset of cells; and (e) assigning said second set of sub-bands to said second subset of cells.

7. The method of claim 6 wherein said predetermined frequency offset is equal to one-half of the bandwidth of a communication frequency channel within the sub-band.

8. The method of claim 6 wherein said first set of sub-bands have a first polarization and said second set of sub-bands have a second polarization, said first polarization being orthogonal to said second polarization.

9. The method of claim 6 further including the steps of:

subdividing said first subset of cells into a plurality of first cell groups such that each of the cells in said first cell group is assigned a corresponding sub-band from said first set of sub-bands and each sub-band of the first set of sub-bands is assigned to several cells of the first cell plurality of groups; and subdividing said second subset of cells into a plurality of second cell groups such that each of the cells in said second cell group is assigned a corresponding sub-band from said second set of sub-bands and each sub-band of the second set of sub-bands-is assigned to several cells of the second cell group.

10. The method of claim 9 further including assigning sub-bands to the first and second cell groups in a periodic pattern.

11. The method of claim 10 including assigning the sub-bands so as to result in an alternating pattern of first cell groups and second cell groups.

12. The method of claim 6, including in step (b) partitioning the available bandwidth into a first set of a first predetermined number of sub-bands, and in step (c) partitioning the available bandwidth into a second set of a second predetermined number of sub-bands, the first predetermined number being the same as the second predetermined number and each sub-band of the second set overlapping in frequency with a corresponding sub-band of the first set.

13. An FDMA communications system having reduced interference, said FDMA communications system operating over a cell network including a plurality of cells having transmitters capable of transmitting on communication frequency channels, said FDMA communications system employing an available bandwidth, said FDMA communications system comprising:

a first subset of cells, said first subset of cells being selected from said plurality of cells, said first subset of cells being assigned a first set of sub-bands each having sub-band bandwidth, said first set of sub-bands being formed from a partitioning of said available bandwidth; and a second subset of cells, said second subset of cells being selected from said plurality of cells, said second subset of cells being assigned a second set of sub-bands each having said sub-band bandwidth, said second set of sub-bands being formed from a partitioning of said available bandwidth, said second set of sub-bands corresponding to the sub-bands of the first set and being offset in frequency from the corresponding sub-bands of the first set by a predetermined frequency offset, the predetermined frequency offset being less than said sub-band bandwidth, whereby corresponding sub-bands of the first and second sets overlap in frequency but do not have identical frequency ranges.

14. The system of claim 13 wherein said predetermined frequency offset is equal to one-half of the bandwidth of said communication frequency channel.

15. The method of claim 13 wherein said first set of sub-bands have a first polarization and said second set of sub-bands have a second polarization, said first polarization being orthogonal to said second polarization.

16. The system of claim 13 further wherein:

said first subset of cells is subdivided into a plurality of first cell groups such that each of the cells in said first cell group is assigned a corresponding sub-band from said first set of sub-bands and each sub-band of the first set of sub-bands is assigned to several cells of plurality of the first cell groups; and said second subset of cells is subdivided into a plurality of second cell groups such that each of the cells in said second cell group is assigned a corresponding sub-band from said second set of sub-bands and each sub-band of the second set of sub-bands is assigned to several cells of the second cell group.

17. The system of claim 16 wherein said first cell groups and second cell groups are assigned sub-bands in a periodic pattern.

18. The system of claim 17 wherein said first cell groups and said second cell groups are assigned sub-bands so as to result in an alternating pattern of first cell groups and second cell groups.

19. The system of claim 13, in which the first subset of cells is assigned a first set of a first predetermined number of sub-bands formed from a partitioning of the available bandwidth, the second subset of cells being assigned a second set of a second predetermined number of sub-bands formed from a partitioning of the available bandwidth, the first predetermined number being the same as the second predetermined number, and each sub-band of the second set overlapping in frequency with a corresponding sub-band of the first set.

* * * * *

UNITED STATES PATENT AND TRADEMARK OFFICE
CERTIFICATE OF CORRECTION

Page 1 of 1

PATENT NO. : 6,088,341
DATED : July 11, 2000
INVENTOR(S) : S. Hinedi et al.

It is certified that error appears in the above-identified patent and that said Letters Patent is hereby corrected as shown below:

Item [54], Title: "OF" should read --OR--

Column 1,
Line 2, "OF CROSS-POLARIZATION" should read --OR CROSS-POLARIZATION--

Column 2,
Assistant Examiner, "Phuong Chau" should read --Phuongchau--

Column 10,
Lines 13-14, "first cell plurality of groups;" should read --plurality of first cell groups;--
Lines 19-20, "second cell group." should read --plurality of second cell groups.--

Column 11,
Line 7, insert --plurality of-- before "first cell groups;"
Line 13, "second cell group." should read --plurality of second cell groups.--

Signed and Sealed this

Tenth Day of July, 2001

Attest:

Attesting Officer

NICHOLAS P. GODICI
*Acting Director of the United States Patent and Trademark Office*